(12) United States Patent  
Baker et al.

(10) Patent No.: US 7,948,518 B1  
(45) Date of Patent: May 24, 2011

(54) VIDEO SIGNAL COMMUNICATION SYSTEM FOR MOBILE OBJECTS ON A RACE TRACK

(75) Inventors: Edward Hendry Baker, Bletchingly (GB); Bryn James Balcombe, Biggin Hill (GB); Henry Barczynski, Essex (GB)

(73) Assignee: Formula One Management Limited, London (GB)

( * ) Notice: Subject to any disclaimer, the term of this patent is extended or adjusted under 35 U.S.C. 154(b) by 687 days.

(21) Appl. No.: 09/623,439

(22) PCT Filed: Feb. 26, 1999

(86) PCT No.: PCT/GB99/00590  
§ 371 (c)(1),  
(2), (4) Date: Dec. 4, 2000

(87) PCT Pub. No.: WO99/45712  
PCT Pub. Date: Sep. 10, 1999

(30) Foreign Application Priority Data

Mar. 5, 1998 (GB) .................................... 9804730.1  
Aug. 7, 1998 (GB) .................................... 9817297.6

(51) Int. Cl.  
*H04N 7/18* (2006.01)

(52) U.S. Cl. ...................................................... 348/157
(58) Field of Classification Search .................. 340/933; 701/301; 348/143, 148, 157; *H04N 7/18*  
See application file for complete search history.

(56) References Cited

U.S. PATENT DOCUMENTS

| 5,194,843 A * | 3/1993 | Jones et al. .................... 340/933 |
| 2002/0022927 A1 * | 2/2002 | Lemelson et al. ............. 701/301 |

FOREIGN PATENT DOCUMENTS

| EP | 0240051 A | 3/1987 |
| EP | 0600818 A | 11/1993 |
| GB | 2273424 A | 12/1992 |
| GB | 2281008 A | 8/1993 |
| GB | 2291554 A | 7/1994 |
| GB | 2287152 A | 11/1994 |
| GB | 2308955 A | 8/1995 |
| GB | 2296632 A | 12/1995 |
| JP | 60246190 | 12/1985 |
| JP | 5075518 | 3/1993 |
| JP | 7087011 | 3/1995 |

* cited by examiner

*Primary Examiner* — Young Lee  
(74) *Attorney, Agent, or Firm* — Foley & Lardner LLP

(57) ABSTRACT

The present invention provides a ground based video pick-up system for transmitting video signals produced on a moving object to one of a number of receivers at a fixed position and selecting the desired signal from the most appropriate one of those receivers.

15 Claims, 10 Drawing Sheets

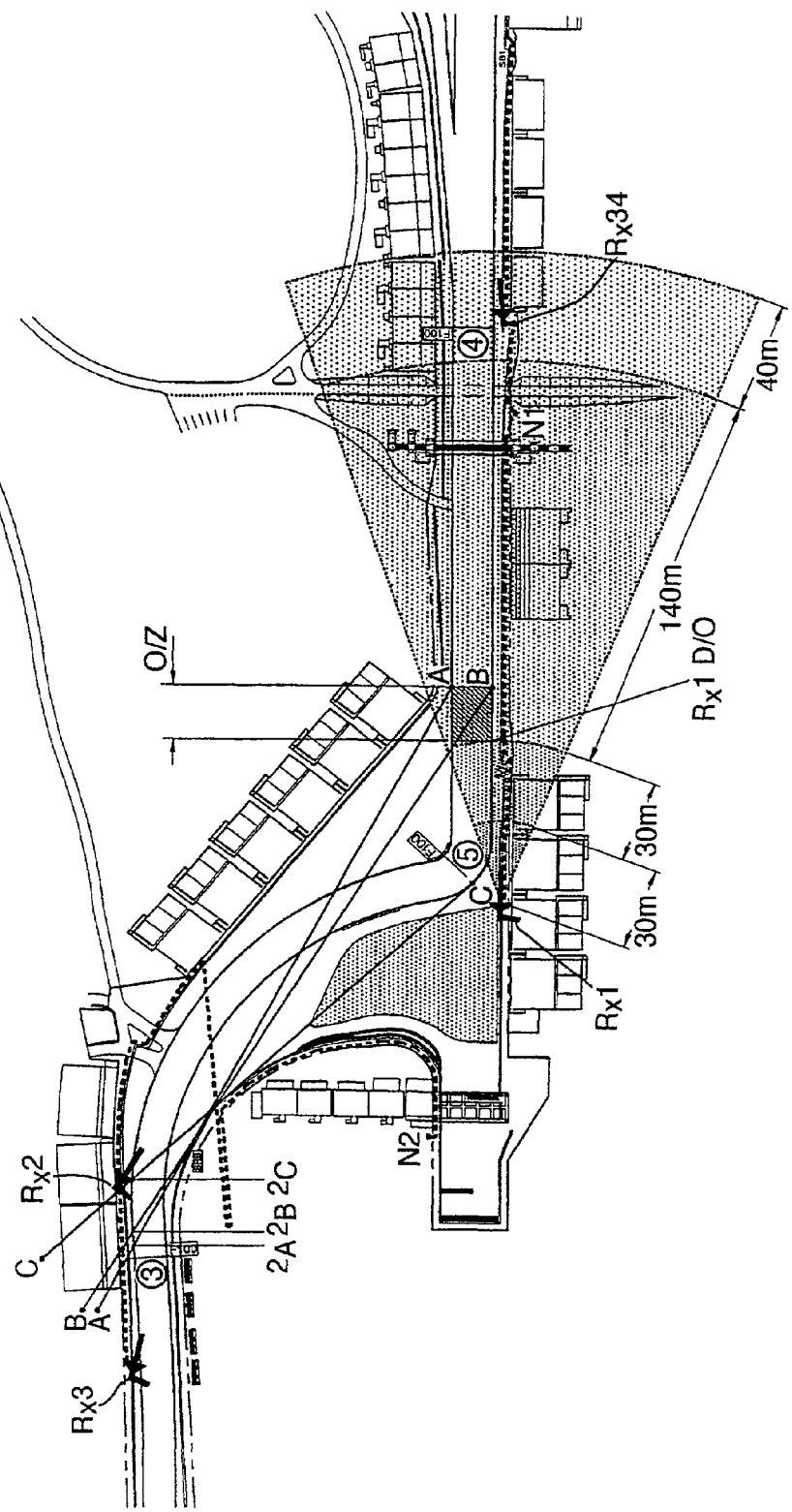
Fig.7.1.

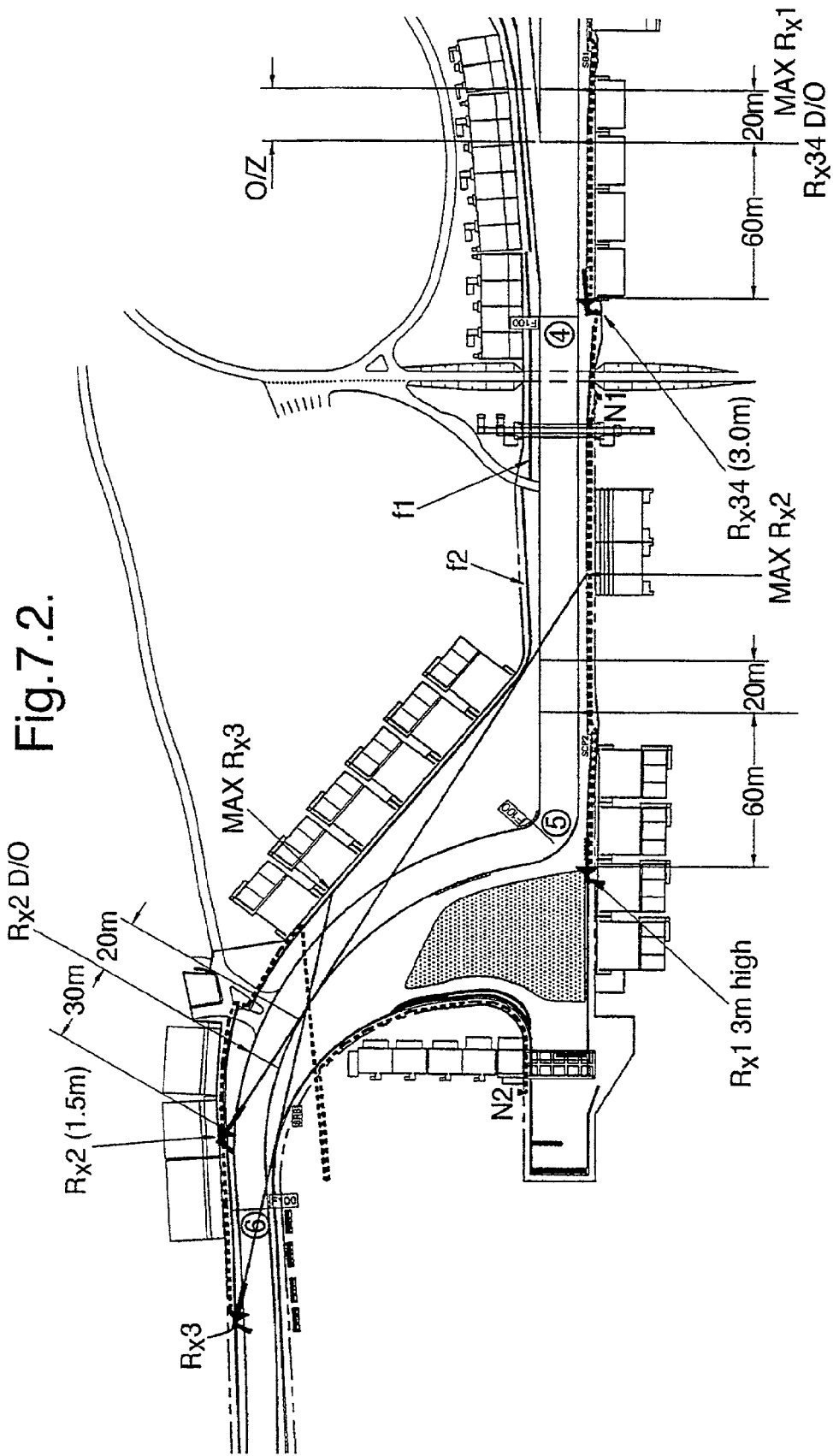
Fig. 7.2.

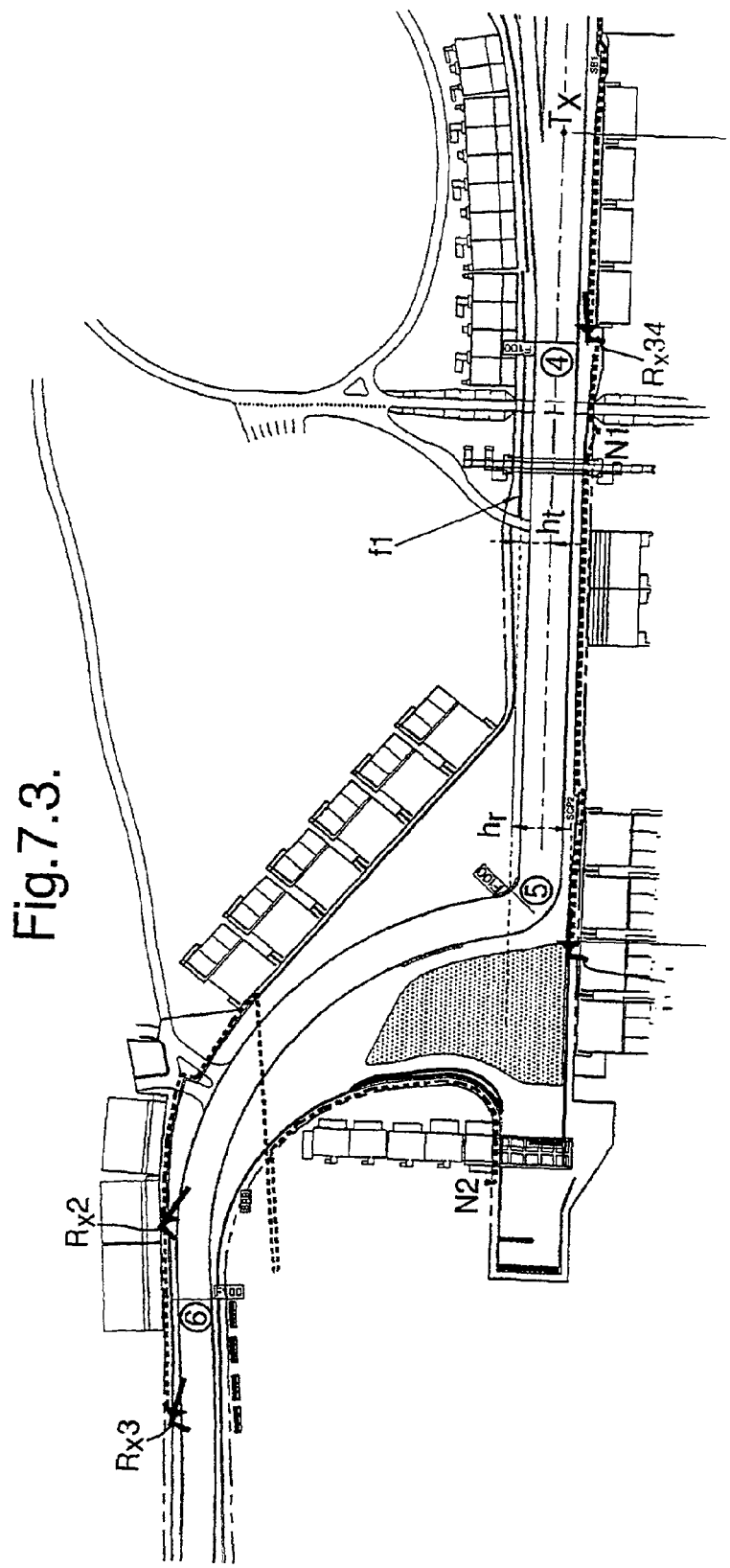

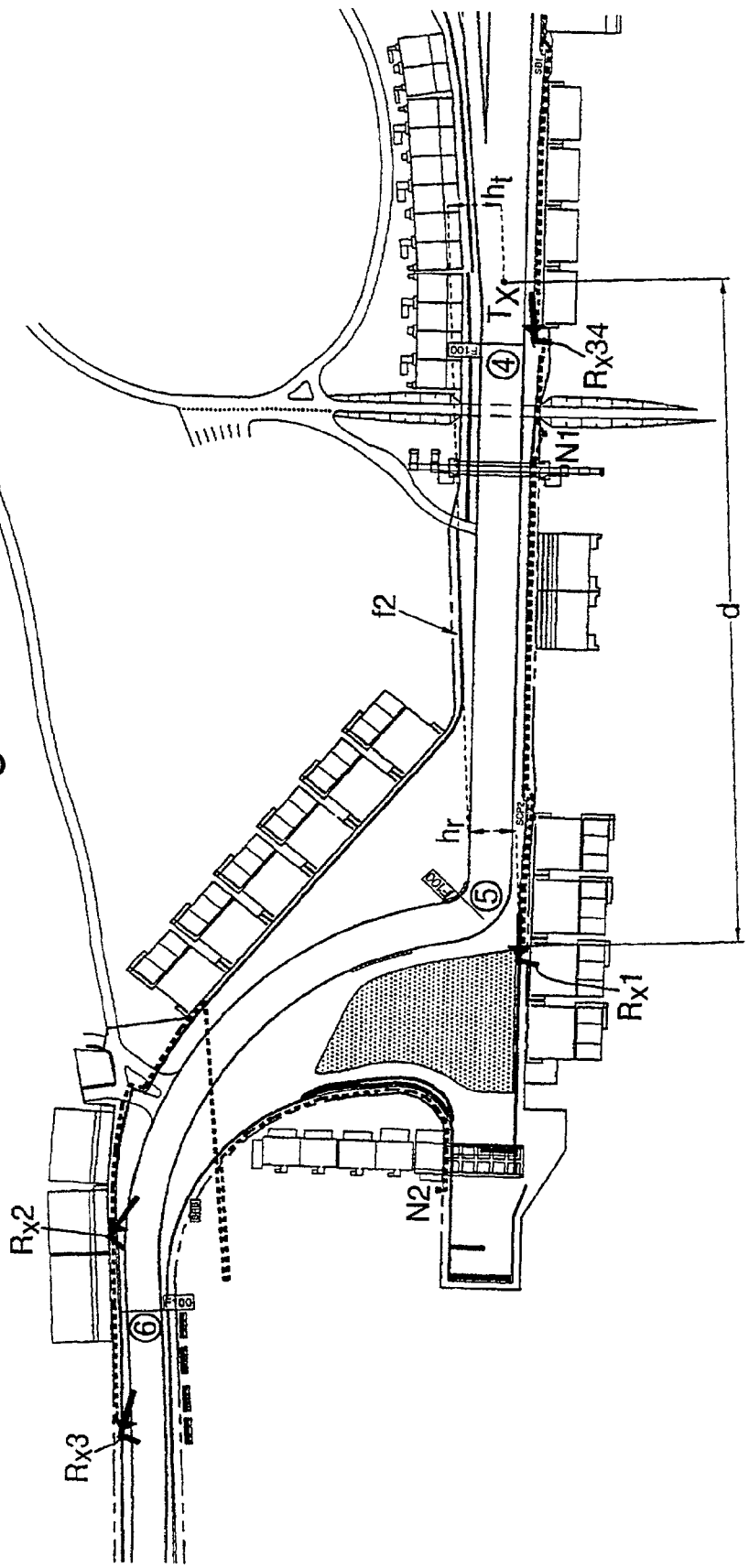
Fig.7.4.

ated with such a system. If a car that is providing the signal does not have a direct line of sight to the helicopter, for example because of
VIDEO SIGNAL COMMUNICATION SYSTEM FOR MOBILE OBJECTS ON A RACE TRACK

FIELD OF THE INVENTION

This invention relates to a system for transmitting data, particularly audio and video signal data, to and from a moving object.

BACKGROUND INFORMATION

In order to provide real time communication of audio, video and data signals between a moving vehicle and a fixed ground station, the vehicle may be provided with an antenna for beaming a signal to a helicopter located above the car. The helicopter then relays the signal from the car to and from a fixed ground station. This system of communicating data between a moving vehicle and a fixed ground station has been particularly useful in the field of motor racing to provide video, audio and data signals from the cars and to allow data and audio signals to be transmitted back to the car.

Current on-board cameras use a microwave transmitter system for communication up to the helicopter. The helicopter then re-transmits a signal on a second microwave frequency to the fixed location.

There are a number of drawbacks associated with such a system. If a car that is providing the signal does not have a direct line of sight to the helicopter, for example because of tall trees or buildings at the side of the track, then the received signal may be weak or obscured completely. In such a situation, it is necessary for the helicopter to remain almost directly above the vehicle to maintain a consistent contact with the car. This can be difficult, particularly with high-speed racing such as Formula One where the helicopter is unable to match the speed of the cars it is attempting to follow. Alternatively, the helicopter can fly at a greater height to avoid objects coming between it and the car. However, this again can reduce the signal quality received by the helicopter due to the increased distance. This can also lead to problems with air traffic control. A further problem of using a helicopter to relay signals is its dependence upon the weather. If the weather becomes unsuitable for flight then it is not possible to provide the signal relaying function at all.

A further limitation of the use of helicopters for relaying signals is the limited amount of weight that can be carried to allow the helicopter to remain at its station for the duration of a race. Similarly, there is a limitation on the amount of power that can be provided for running the radio frequency systems.

BRIEF DESCRIPTION OF THE INVENTION

Therefore, according to the present invention, there is provided: a communication system including:
a video signal source and transmitter provided on a mobile object for generating and transmitting said video signal on at least a first carrier frequency;
at least first and second receivers for receiving said transmitted video signal on said first carrier frequency, said first and second receivers having at least partially overlapping detection areas and being located at spaced apart locations;
a position detector for generating a position signal indicative of the position of said mobile object using indications other than parameters of the received video signal and carrier;
a controller responsive to said position signal for selecting one of the video signals received by said first and second receivers and outputting said selected signal, said controller being located other than in said mobile object.

According to the present invention there is also provided a method of communicating a video signal between a mobile object and a stationary location comprising:
transmitting the video signal on a first carrier frequency from a transmitter on the mobile object;
providing at least first and second receivers at spaced apart locations for receiving the signal from the transmitter on said first carrier frequency; and
determining the location of said mobile object using indications other than signal parameters of the received signal or its carrier;
selecting the signal received by one of said first and second receivers for output at said stationary location.

The present invention still further provides a method of establishing a communication system for communicating a video signal between a mobile object provided with a transmitter for transmitting the video signal on a first carrier frequency and a stationary location comprising providing a plurality of receivers each having a detection area within which the receiver is able to receive the signal from the transmitter on said first carrier frequency when the transmitter is in the detection area, the method comprising the steps of:
arranging each receiver by placing a first receiver at a first location to define a first detection area, then positioning each subsequent receiver at a distance from the previous receiver such that the detection area of the subsequent receiver overlaps with the detection area of the previous receiver to form a continuous strip within which the signal from the transmitter is receivable by at least one of the receivers, and wherein the signal received by said at least one receiver is provided to said stationary location.

The present invention is preferably also arranged so that switching between receivers is carried out on the basis of the position of the mobile object. The receivers are preferably arranged so that the area in which they can receive signals at an acceptable level overlaps with the receiver in the corresponding adjacent area.

The transmitters on the mobile object may be arranged to be able to transmit on a number of different frequencies. Similarly, the receivers may also be adapted to receive on a number of different frequencies. The operating frequencies of the transmitters and the receivers are preferably controlled by data messages sent from a central location to the moving objects and receiver stations. Each frequency may be received by a dedicated antenna (i.e. each receiver having its own antenna) or a single antenna and an RF splitter may be used with a proportion of the RF signal being directed to each receiver. The receiver selects the wanted frequency in the RF signal.

The video signal is preferably transmitted from the mobile object to the receivers using a microwave carrier. This is preferably at 2.5 GHz. Other data and audio signals may be modulated onto the video signal or transmitted on a separate frequency, preferably between 100 MHz and 40 GHz.

The present invention requires only a single frequency to transmit a video signal as there is no re-transmission of the signal as in the case of a helicopter-based system. This allows a doubling in the number of signals that can be transmitted for a given number of frequencies. Furthermore, because the transmission from each transmitter is received by a receiver at relatively close range, the transmission power can be reduced. This also allows the same frequency to be used simultaneously between another transmitter and receiver at a different location. This is not possible with helicopter based systems in which all signals have to go via one helicopter and so only one transmitter could use a given frequency in order to avoid interference.

By providing sufficient receivers to ensure that the signal transmitted is always received by at least one receiver there is never a break in transmission. As the signal is being transmitted substantially horizontally along the ground to a trackside receiver, trees and buildings do not present an obstruction to the signal path.

The receivers are preferably provided in a trackside receiver station. The station preferably includes an antenna and optionally additional receivers.

DETAILED DESCRIPTION OF THE INVENTION

Brief Description of the Drawings

A specific embodiment of the present invention will now be described by way of example with reference to the accompanying drawings in which:—

In FIG. 6, view 6A is a side elevational view of the detection range and view 6B is a vertical view from above of the same detection range.

FIG. 7.1 shows schematically the factors which are taken into consideration when placing a first receiving station along a section of racetrack.

FIG. 7.2 shows schematically the factors which are taken into consideration when placing a second receiving adjacent to the first receiving station along a section of racetrack.

FIGS. 7.3 and 7.4 show schematically how the reflection equation described herein are applied to receiver locations in various practical environments.

DESCRIPTION OF PREFERRED EMBODIMENTS

Figure 1:
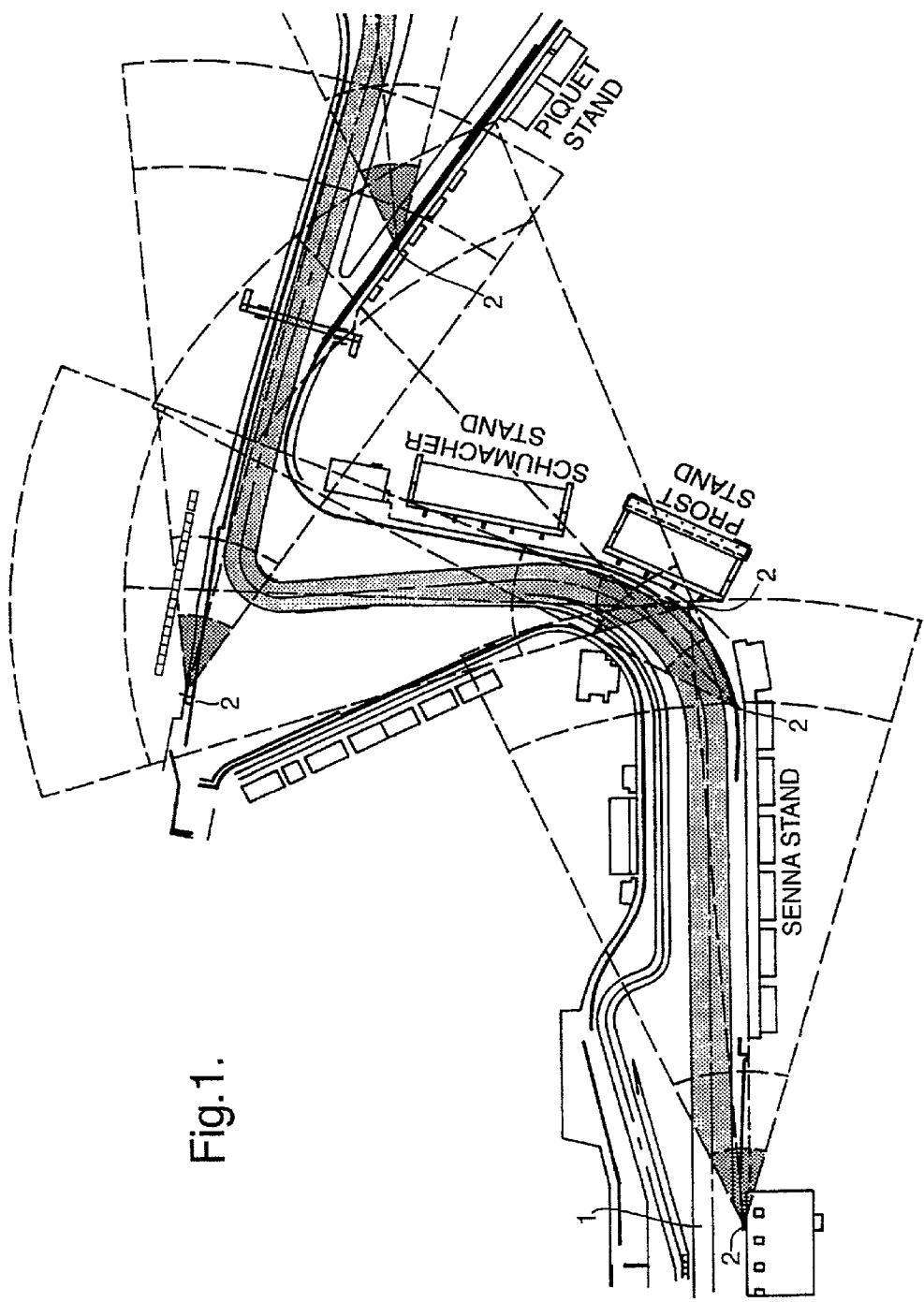
FIG. 1 shows an example of a layout of receiver stations around a section of racetrack.

FIG. 1 shows an example of a section of racetrack 1 and a suitable arrangement of receiver stations 2 (referred to herein as stations) around such a section of track to provide continuous reception of a video signal from an on-board camera in a racing car. The embodiment of the present invention described herein relates to a system for providing communication of a video signal from a moving racing car to a fixed location such as an outside broadcast unit. Each station includes at least one antenna and one receiver. This is preferably a directional antenna (e.g. helix antenna) but may be an omnidirectional antenna. The dashed lines in FIG. 1 provide an indication of the detection angle of the antenna on each station 2.

The signal received by the antenna is fed to the receiver in the station and then fed back to a controller at a central location where the signal from one of the receivers is selected as the most appropriate. The selected signal is then used to provide the output signal from the system, e.g. for broadcast.

It will be apparent that, by providing sufficient stations around the periphery of the track, as the car travels around the track the video signal transmitted by the car is always receivable by at least one of the stations.

In order to ensure this continuity of reception, there is some overlap in the detection range of one station and its neighbour. This overlap (preferably at least 20 m) ensures that as the car travels from the reception area of one station to the reception area of the next station, the car passes through an area where the video signal transmitted by the car is received by the antennas of both stations. At some point in this area, the system switches from using the signal from the first station to using the signal from the next station.

Figure 2:
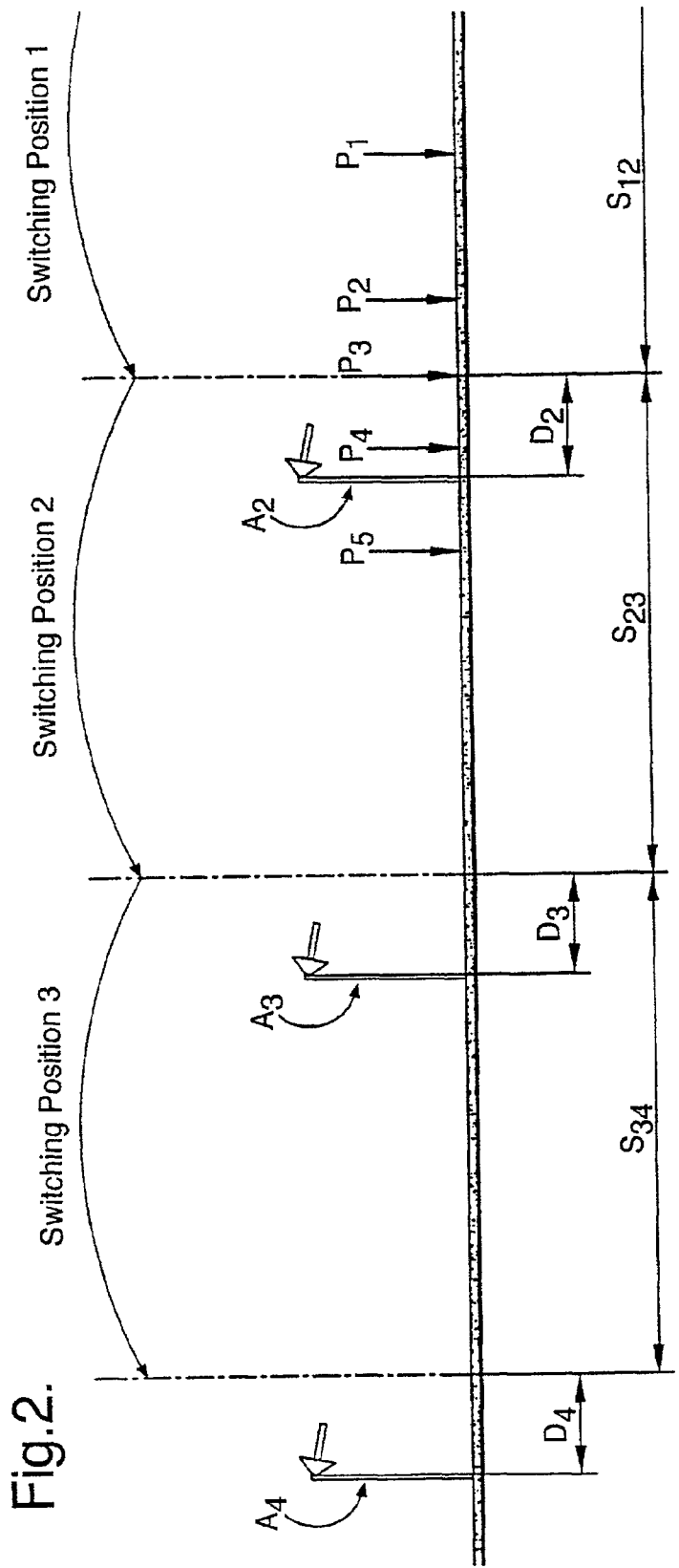
FIG. 2 shows a representative arrangement of receiver stations relative to each other and the respective switching positions for switching from the receiver in one station to the next.
Figure 3:
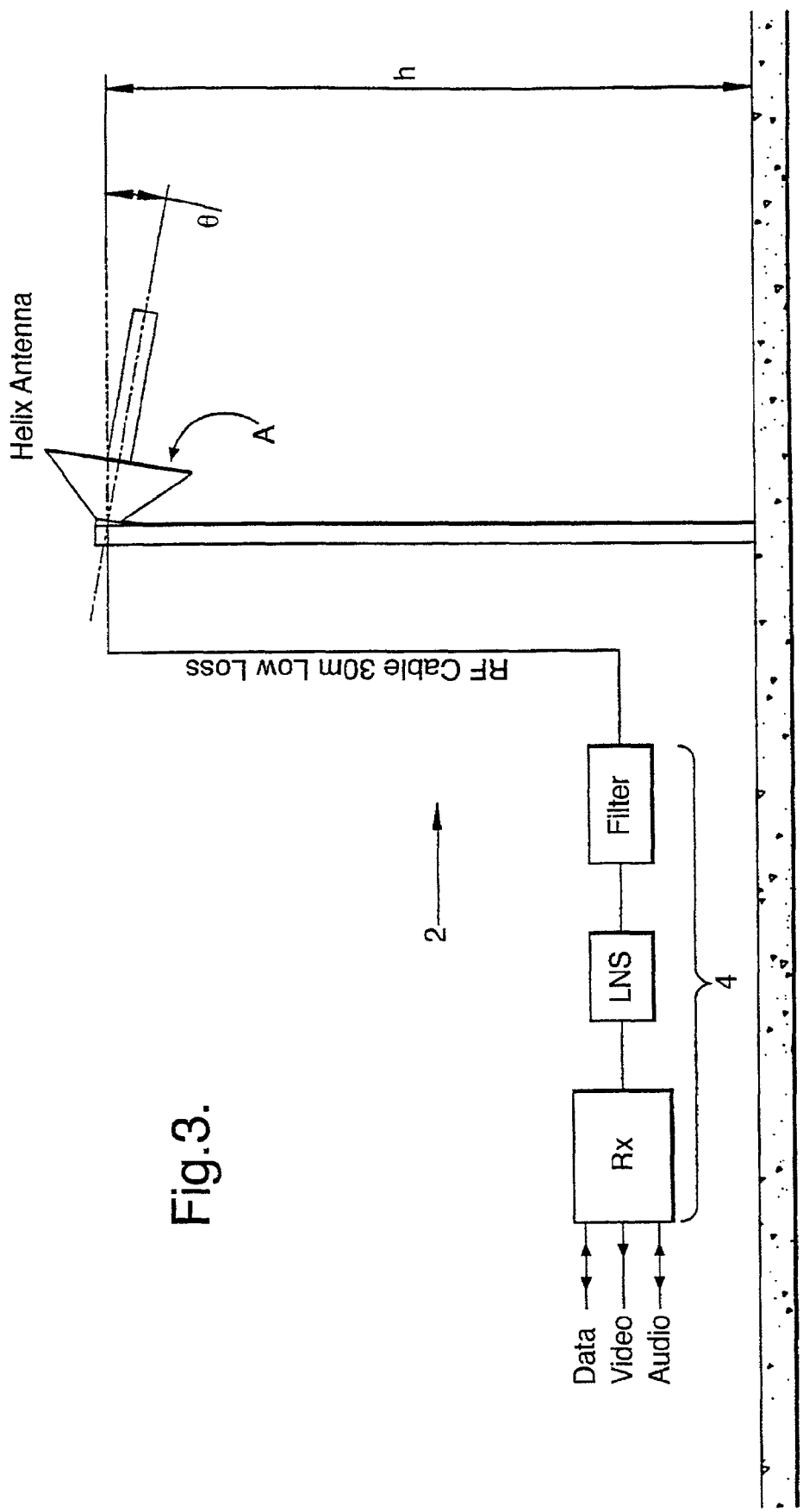
FIG. 3 shows a schematic layout of the arrangement of one of the receiver stations according to the present invention.

FIG. 2 shows a schematic view of a section of a track showing the antennas ($A_2$, $A_3$, $A_4$, etc.) of a number of stations. As the car enters from the right, it first passes position $P_1$. The antenna $A_2$ is initially receiving the signal transmitted by the car. As the car continues to the point $P_2$, the car enters the reception range of the next antenna $A_3$ at which point the signal being output is received by $A_3$ as well as by $A_2$. However, the signal being received by $A_2$ is still the one being utilised to provide the output signal. As the car passes position $P_3$, the system switches from using the signal from $A_2$ to using the signal from $A_3$ although the signal from the car is still being received by $A_2$. As the car continues on through position $P_4$, antenna $A_2$ eventually becomes unable to receive the signal from the car so that only antenna $A_3$ is receiving the signal. This switching procedure is repeated as the car progresses around the track and moves from the reception area of one station to the next. As is clear from FIG. 2 switching takes place at a distance $D_2$, $D_3$ or $D_4$ before the car reaches the antenna of the station currently providing the video signal which is being utilised. This ensures that a good quality signal is still being received up until the changeover. If the changeover was delayed until the car was level with the antenna, the signal strength received by the antenna may drop off considerably as the car drops out of the optimum reception zone of the antenna.

The exact point at which switching takes place is very important. If switching occurs too early, e.g. at $P_2$, the strength of the signal received by $A_3$ may be weak. As described above, leaving switching until too late can result in the signal received by $A_2$ being too weak. If the received signal is weak then the output signal may be distorted or noisy. However, to determine the appropriate switching point it is not sufficient to simply measure the strength of the signal received by each receiver and then select the strongest of those. This can lead to a misleading indication of the best signal and hence the wrong switching position. One of the reasons for this is interference caused by the transmitted signal arriving at the antenna indirectly, i.e. having reflected off some other object. This phenomenon, known as multipath, results in the direct and indirect signals having taken paths of different lengths to arrive at the receiver. Depending upon the difference in the path lengths, the two signals may constructively interfere, providing a stronger signal, or destructively interfere reducing the signal strength. Furthermore, as the car moves, this difference between the path lengths may change and so the signal strength may vary between being very weak and being very strong. This variation makes it difficult to use the signal strength as the sole accurate indicator of which receiver to use for the output signal.

The system of this invention determines the appropriate time to change from one receiver to the next based upon the position of the car relative to the antenna. This requires knowledge of the position of the stations and the car. This can be determined in a number of ways. On a racetrack, data may be available from the time keeping system. This allows the position of the cars to be determined accurately at any time.

However, there are a number of alternative ways of determining position. Apart from well-known systems such as GPS (Global Positioning System), it would be possible to use a custom system for providing position information, for example by utilising the stations themselves to determine the distance from the car. Even where highly accurate position information is not available, it is still possible to interpolate to provide an estimated position. In a racing track situation, the cars follow fairly predictable position and speed paths, allowing accurate estimation of the car's position.

On a racetrack, which may be several kilometers long, the stations may be a long way away from each other and from the controller at the central location. The simplest way of delivering the signals received by the receivers to the central controller is by directly connecting, e.g. via a cable, each receiver to the controller.

In a motor race, it is desirable to have cameras on more than one car. The system can enable a number of cars to provide video signals, by each car transmitting on a different frequency. Where two or more cars are in the reception area of the same station, the antenna receives both signals.

This system can be further developed to allow for additional cameras where the number of frequencies available for transmission is limited or if there are a large number of cars in a race. Furthermore it may be desired to have more than one signal being produced from each car (e.g. forward and rearward views or a view of the driver). Under such circumstances a large number of channels may be required. If the bandwidth available is limited, it is possible to utilise the same frequency for signals provided by different cars. This is possible so long as cars transmitting on the same frequency are sufficiently far apart such that the station picking up the signal from one car does not pick up a significant amount of the signal from another car transmitting on the same frequency. This can be achieved by monitoring the position of the cars and where two cars using the same frequency are in danger of coming close enough to interfere with each other the controller will instruct the transmitter on the car to change to a different frequency which is not being used by any other car in close proximity or to stop transmitting. The position information used to determine switching between stations may be used to determine the allocation of frequencies to the transmitters. In this way, several cars at different positions around the track can use the same frequency simultaneously. This represents a considerable advantage over the helicopter-based system that could only utilise a single transmitter per frequency. Furthermore with the present invention each transmitter only uses a single frequency rather than the two required with the helicopter system, i.e. one for transmitting to the helicopter and one for the relay to the ground based receiver.

Having a separate connection between each receiver and the central controller leads to a large number of potentially very long cables between the receivers and the central controller. Therefore, in an alternative embodiment of the present invention there is provided a common "bus" system to which all receivers are attached. In its simplest form, this comprises two connections: an A-line and a B-line, each line being capable of carrying a video signal. These two lines are arranged to connect the central location and each of a number of nodes. However, instead of the line going from the central location to each node, the lines connect from the central location to the first node and then from the first node to the second node and so on until the last node which is preferably connected back to the central location to form a ring. Each receiver may have its own node or a node may be provided for more than one receiver. For example, for a set up comprising twenty receivers, five nodes may be provided with four receivers connected directly to each node.

Figure 4:
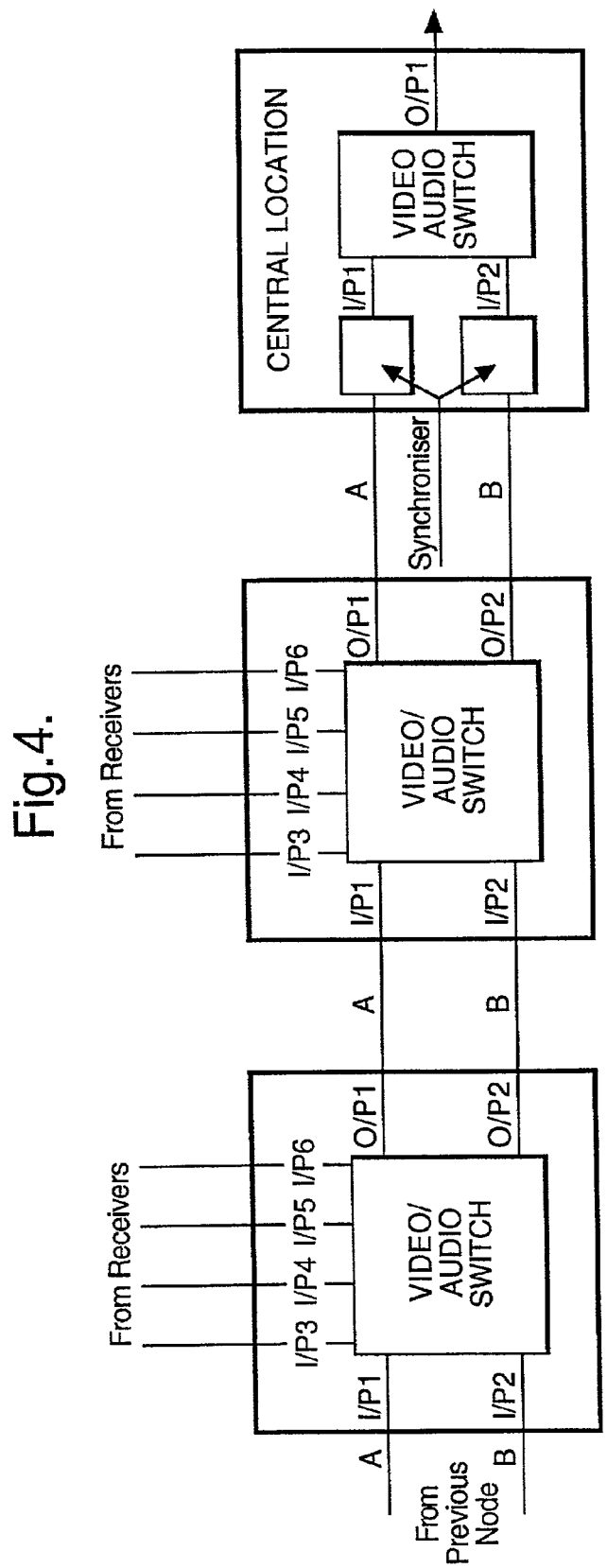
FIG. 4 shows a schematic layout of the signal relay system of an embodiment of the present invention.
Figure 5:
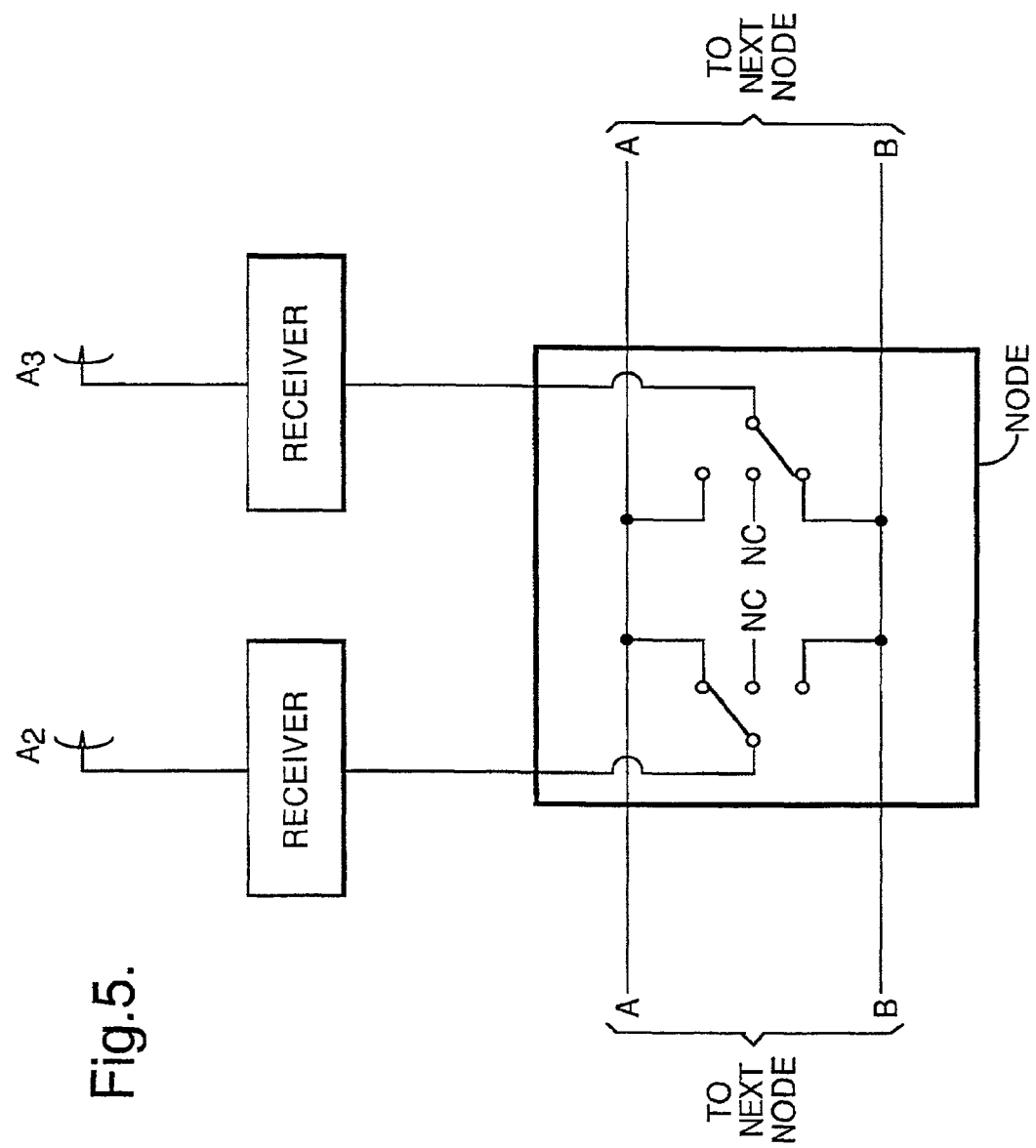
FIG. 5 shows a schematic example of a node used in the signal relay system.

FIG. 5 shows an example of a node to which two receivers in two stations receiving the signals provided by antennas $A_2$ and $A_3$, are connected. As is shown schematically in FIG. 5, signals from each receiver can be connected either to the A-line, the B-line or to neither line (NC). Referring to FIG. 2, as the car arrives at the position $P_1$ the signal transmitted by the car is being received by a $A_2$ which, as is shown in FIG. 5, is connected to the A-line. The received signal is then passed back down the line from node to node until the signal is received at the central location. As the car continues on past $P_2$, the signal transmitted to the car is then receivable by $A_3$ and the switch in the node connects the signal provided from the receiver for antenna 3 to the B-line. The received signal from $A_3$ is then passed from node to node down the B-line, again back to the central location. Thus, between positions $P_2$ and $P_4$ the central location is provided with two video signals corresponding to the signals received at antennas $A_2$ and $A_3$. As shown in FIG. 4, the central location is provided with switching means. The switching means outputs the video signal provided on the A- or the B-lines according to a control signal provided by a controller. In this embodiment the control signal comprises data messages sent from control software operating on a computer. The software selects which of the video signals on the A-line and B-line is output. Therefore, initially, the software controls the switch to provide an output signal from the A-line, then as the car passes point $P_3$, the software sends a message to the switcher so the output corresponds to the signal being received on the B-line (i.e. that received by antenna $A_3$).

Two synchronisers are employed to ensure the sync pulses of the video signals on the A-line and B-line are coincident. When a switch command is sent, the switcher waits until the next vertical blanking interval of the current video signal and then switches between the A-line and the B-line, or vice versa. In order to avoid image distortion, such as frame roll, when switching between the signals output by one receiver and the next, a frame memory may be employed. The use of a frame memory avoids any problems due to the frames in the two signals not being synchronised.

As the car continues on, the signal from $A_2$ will be lost. Then as the car comes within the range of $A_4$, the node to which $A_2$ is connected will disconnect $A_2$ from the A-line and the node to which $A_4$ is connected will connect the signal received by $A_4$ to the A-line so that both the A-line and the B-line are relaying signals received from the car. Again, at the appropriate time, the software sends a message to the switcher in the central location to switch from outputting the signal on the B-line to outputting the signal on the A-line (which corresponds to the signal received by $A_4$). This process is repeated as the car continues around the track with the A-line and B-line alternatively providing the output signal. The exact timing of the disconnection of one receiver (e.g. $A_2$) and the connection of the next receiver to the same line (eg $A_4$) is not essential as long as the signal on that line is not being utilised. For example, the disconnection of $A_2$ from the A-line may be as soon as the signal received by $A_2$ is too weak or it may be delayed until the time at which the signal from $A_4$ is sufficiently strong.

FIG. 5 indicates that once the RF signal has been received it is converted back to a baseband video signal. The A-line and the B-line are therefore independent of the received frequency and hence can be used to provide transmission of video signals from more than one car. However, the A/B Line pair are only capable of transmitting the two video signals required when following a single car around the track. Thus, in order to make use of the possibility of following two different cars around the track, a separate pair of lines e.g. a C-line and D-line can be provided.

Again, because the C/D-line pair are independent of frequency they can be used in the transmission of video pictures from a car transmitting on any frequency within a specified receiving band. The second car may be transmitting on the same frequency as the car being followed by the A/B-line pair. However the cars are required to be at different locations around the circuit so that the RF signals reaching the receiver from the two cars do not interfere with each other.

Thus the addition of extra line pairs allows an increase in the system capacity by one car. Further pairs (E/F-line, etc.) may also be added to allow third and further cars to be followed around the track. It is however, still possible to have several cars transmitting at the same time around the track without having a second (C/D-line) system. It is however only possible to relay the signal from one of those cars at a time with the signals received by other antennas from other cars not being connected to the A or B-lines.

Alternatively, if two cars using the same frequency become too close to each other on the track then one of these cars could be sent a message to change its transmission frequency, thus avoiding interference.

In an alternative embodiment of the present invention the receivers may be connected to a network (e.g. LAN). The network may link all the receivers or just a proportion of them in conjunction with other networks. In this way, the central controller can instruct which receivers should send their received signals.

The layout of the receiver stations around the track requires careful planning to provide the required coverage with the optimum number of stations. In theory it would be possible to simply place a large number of stations at regular intervals around the track to ensure that the signal transmitted by the car can be detected by at least one of them at all positions on the track. However, such a layout introduces other problems into the system. If stations are placed too close together then, apart from the unnecessary additional cost of having more stations than necessary, the complexity of the switching and controlling system is increased because the signal from a transmitter may be picked up by several antennas. Equally having too few base stations may leave areas of the track where only a poor quality or no signal can be received. Therefore, in order to achieve consistent coverage of the entirety of the track, with the minimum number of receivers, the receiver stations are laid out as follows.

A typical helix antenna provides a detection area (or receive envelope) which is a 30° segment of a circle with a maximum range of around 200 meters. The receive envelope cut off area is from 30 to 60 meters depending on the height of the antenna above the ground (from 1.5 meters to 3 meters respectively).

The 30 degree segment of a circle is described as the beamwidth of the antenna and is a specification supplied by the antenna manufacturer. The maximum range is determined by the maximum distance at which the received power level is sufficiently high to produce broadcast quality video signal. The minimum receive power level used for broadcast quality pictures is −60 dB.

The receive envelope cut off area is the distance in front of the antenna at which the video signal breaks up. The break up in the video picture is caused by a drop in the received power level resulting from cancelling of the direct signal by a reflection of the same signal off the ground. The distance at which this occurs is dependant on the height of the transmit antenna and the height of the receive antenna above the ground. The frequency of the RF signal will also change the location of the cut off point. The amount of reflection and hence its effect depends on the surface over which the wave is travelling as well as upon the wavelength of the signal. The following reflection equation can be derived:

$$\text{Received Power} = 4P\ \sin^2\left(\frac{2\pi h_r h_t}{\lambda d}\right)$$

Where P is the received power without reflection i.e. under free space conditions, $h_r$ and $h_t$ are receiver and transmitter heights relative to the reflection surface and d is the distance between the receiver and transmitter. The reflection surface may not be the ground. For instance it may be a wall or barrier. In this case the values $h_r$ and $h_t$ refer to the distance between the reflection surface and the respective antennas.

Analysis of the reflection equation indicates that to maximise the receive envelope close to the antenna, it is preferable to mount the antenna low to the ground. However, the RF signal is attenuated as the antenna becomes closer to the ground which reduces the maximum distance of the receive envelope. The attenuation is the result of the ground entering the first Fresnel zone. Fresnel zones surround the direct ray path between the transmitter and receiver. The first Fresnel zone refers to the zone immediately surrounding the direct ray path. This zone is defined in such a way that the path length of a ray which has been deflected between the transmitter and receiver is within half a wavelength of the path length of the direct ray. As the largest part of the signal power passes through the first Fresnel zone, any object, including the ground, aligning within this zone will lead to attenuation of the received signal. A compromise is therefore made when mounting the antennas. Usually at a Grand Prix circuit the track is surrounded by metal barriers, known as Armco, which are approximately 1 meter high or with fencing which is approximately 3 meters high. Antennas are mounted half a meter above the Armco so that the RF Signal is not attenuated by being located near to the metal structure or the tyre wall in-front. Therefore, because the antennas are mounted by these track features, the most common mounting heights for the antennas are 1.5 meters and 3 meters. The mounting requirements for each site are determined by reviewing the physical layout of the site at that point and determining limiting factors which may prevent optimum locations of each circuit or conducting an on the spot circuit review.

Figure 6A:
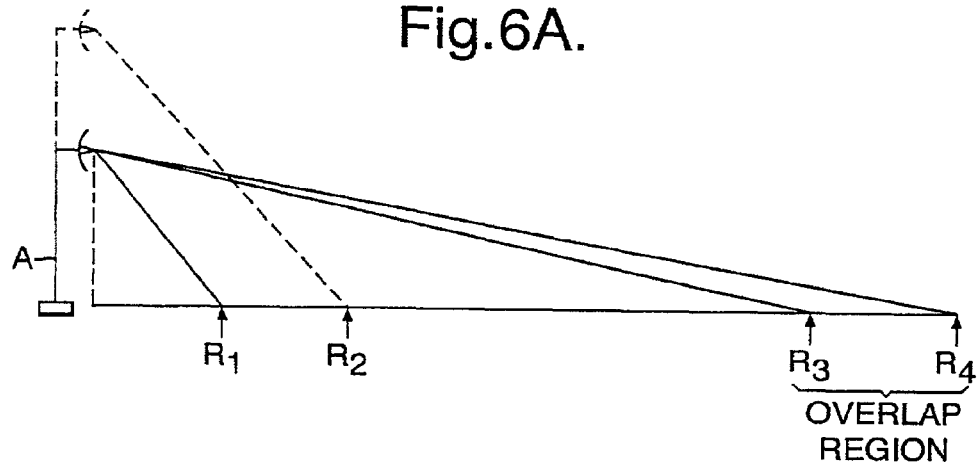
FIG. 6 shows an example of the detection range of an antenna.
Figure 6B:
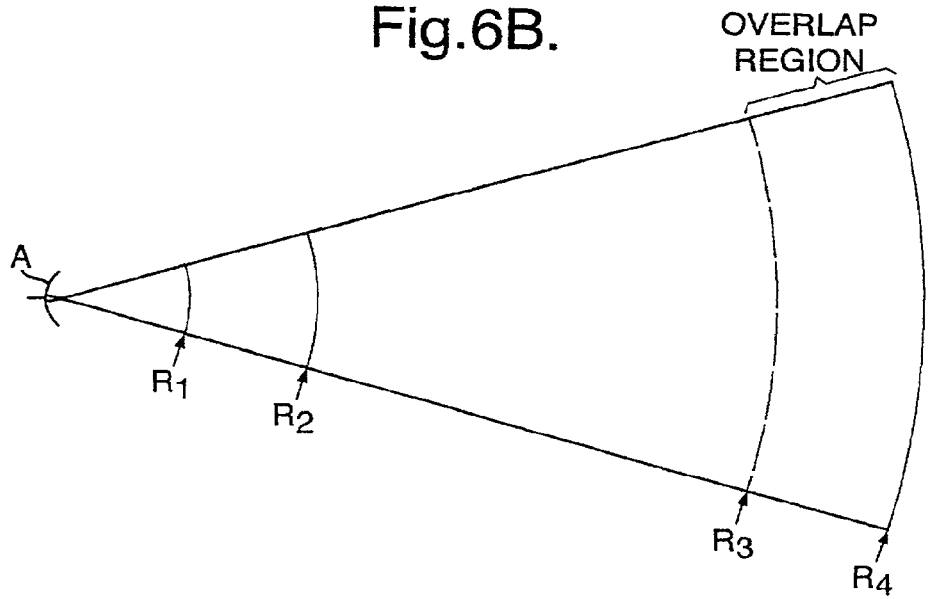

Having determined the height of the antenna, the receive envelope, which lies between the outer limit of the antennas range ($R_4$—see FIG. 6) and the inner limit ($R_1$, $R_2$) determined by the point at which signal drop out occurs, can be determined. Having determined this receive envelope, it is necessary also to establish the amount of overlap with the receive envelope of the antenna of the adjacent station to ensure a smooth transition from using the signal from one station to using the signal from the next station. Thus, a range $R_3$ corresponding to the point at which the signal from the adjacent antenna can no longer be received is chosen defining an overlap region between $R_3$ and $R_4$.

In practice, in order to determine the layout of the stations around a track, the position of the first station (Rx1) is selected at the end of a long, for example, the Start/Finish straight (see FIG. 7.1). The performance of this site is then established, the results of which enable the station previous (Rx 34) to the current station (Rx1), and the subsequent station (Rx2) to be located.

In FIG. 7.1, Rx 1 is mounted at 3 meters high, therefore, using the reflection equation, the drop out point for the site will be 60 meters in front of the antenna. The operation of the system is based on an optimum overlap zone between the receive sites of 20 meters, this allows for fluctuation in vehicle position at the point at which the video is switched. If accurate position information is not available then the overlap zone can be increased to avoid the possibility of the signal being lost by switching from one receiver to the next too soon or too late. This 20 meters is added onto the drop out point and establishes the point on the track at which the subsequent station must be providing clean pictures (points A and B).

A line is then projected from the subsequent station pick up point on the inside of the track (point A), in the direction the cars travel, onto the perimeter fence at the maximum possible distance around the track. The projected line should provide a clear line of sight from the transmitter to the receiver and should therefore not cross any defining boundary lines such as perimeter fences, buildings, trees or other structures. Once completed the process should be repeated to the point on the outside of the track (point B). As can be seen in FIG. 7.1 the resulting site location may be different to that already determined. It should also be noted that if the receive station was located at position A on the perimeter fence then a clear line of site to pick up point B could not be achieved because of the perimeter fence on the inside of Turn 2.

The location determined through this process then has to be evaluated for providing a clear line of sight for the duration of the planned receive envelope. FIG. 7.1 indicates that location C on the perimeter fence is the maximum distance around the track at which a clear line of sight to point C on the track could be obtained. This therefore implies that neither locations A or B are suitable for the receiver station. The final check is to ensure that location C still provides a clear line of site to the required pick up point. Once confirmed, then the ideal geometrical location of the receive station can be fixed. The effect of the surrounding structures in causing the RF signal to be reflected into the receiver station must then be determined using the reflection equation.

The effect of the surrounding structures to cause destructive reflections at receiver station RX1 must be established before the location of the preceding station (RX34) can be determined. Once the maximum pick up distance for receiver station RX1 has been established then the preceding site must be located to have a drop out point 20 meters below the distance (to ensure the correct amount of overlap). In FIG. 7.2 the preceding station to RX1 is shown as being mounted at 3 meters high and therefore must be located a further 60 meters below the drop out point. FIG. 7.2 also indicates the procedure for locating the subsequent site to receiver station RX2.

FIGS. 7.3 and 7.4 indicate how the reflection equation is applied in a practical environment. It can be clearly seen in both figures that the receive antenna height (relative to the reflecting plane—in this case the fence) is a constant value. In FIG. 7.3 the fence under investigation (FENCE 1) is parallel to the direction of travel and hence the height of the transmitter also remains at a constant distance. For FIG. 7.3 the only variable becomes the transmission distance as the transmitting vehicle moves closer to the receive station. In FIG. 7.4 it can be seen that the height of the transmit antenna will change as the transmission distance changes, therefore, two variables exist. Application of the reflection equation becomes more complicated when performing calculations relating to curved fences (as for example would be required in establishing the performance of receive station RX3 in the figures). In this case the height of the receive antenna relative to the fence would also change continuously as transmission distance changes, and therefore the equation includes three variables.

It should be noted that the drop out distances produced by the reflection equation calculations can be very sensitive to small changes in antenna height relative to the reflective plane. For example, if the height of the transmitter was 4 meters and the height of the receiver 5 meters the first drop out point would occur at 333 meters (assuming the transmission frequency was 2.5 GHz). If the transmitter height was increased to 4.5 meters the first drop out point would become 375 meters. From this brief calculation it can be derived that if the vehicle follows a different path around the track, then the manner in which reflections from the surroundings affect the receiver station performance could vary greatly. It also indicates the importance of accurate location information to ensure theoretical system planning is as accurate as possible.

A further item to consider in the application of the reflection equation is the term relating to the RF signal wavelength and hence frequency. If, using the first example above, the frequency was lowered to 2.4 GHz then the first drop out point would occur at 320 meters, a difference of 13 meters. From this it can be derived that the set-up of the system would be different depending on the transmission frequency.

Having determined the theoretical locations for the receiver stations, using the appropriate RF equations, it is then also possible to consider the logistical implications of installing the stations. Factors such as position of perimeter openings, general accessibility, cable distances between receiver station and node, location of advertising sign boards, location of structures to which antennas can be mounted, safety of site location.

For example, FIG. 7.2 shows that receiver station RX34 is connected to Node 1 (N1). The cable run is about 40 meters which would be relatively quick to pull out, but there is a track access point just before the site, so a trench would need to be dug and the cable buried for protection of the cable and to keep the access way clear. The site could not be located just before the access point because the stagger in the fence would block the antenna, therefore the receiver station could be moved back to approximately the same location as Node 1 making the cable run short and easy. The net result would be to increase the overlap with station RX1, but to reduce overlap with station RX33. As this example indicates all important factors must be considered as early in the planning stage as possible, and where possible flexibility for minor adjustments should be built into the planning of the system.

The above method of sighting the receiver stations relates to stations provided with antennas having a narrow detection range (eg. 30°). However, these principles can be applied using antennas having a larger detection angle.

Each station comprises at least one receiver. Each receiver may have its own dedicated antenna or the station may have a single antenna and a splitter for separating the various frequencies received and sending them to respective receivers. The stations also include filters and de-modulators 4, for extracting the video signal from the received microwave transmission. The video signal may then be sent to the central controller as a baseband signal which includes the video picture information and the audio signals modulated onto separate sub-carriers. Alternatively, the system may send the actual signal received by the antenna stations, i.e. the microwave signal, back to a central location where the receiver units and demodulator would be located. This type of system would require the RF signal to be modulated onto the fibre optic transport system, and each site would preferably have a dedicated fibre link back to the central location.

The antennas are preferably helix antennas but these may be replaced by any other type of suitable antenna (such as fan-beam antennas, patch antennas or omnidirectional antennas depending upon their location and the layout of the track. For example, an omnidirectional antenna may be used to cover a bend whilst a directional antenna is used for straighter sections. The directional antennas preferably have an angular range of between 30° and 120° depending on their location.

Whilst this invention has been described in relation to a racetrack location, it is clearly applicable to other applications. The system is equally applicable to a non-closed track e.g. for a road race. Furthermore, the system could be used in any situation where the transmission of video (or other high bandwidth signals) from a moving object to a stationary object is required. Applications could include transmitting pictures from bicycles or cars (e.g. police cars) to roadside receivers for transmission to other police cars or a central control room. The system could even be extended to provide a mobile video communication system.

Whilst the above described embodiment refers primarily to the communication of video data, it is intended that the system may also provide communication of audio and data signals both to and from the car as well as video signals back to the car. Clearly, once a communication link is established, as described above, it is simply a matter of sending a signal to the car down the established link rather than receiving from it.

The invention claimed is:

1. A system for providing continuous reception of a video signal from an on board camera in a mobile object as it moves around a race track comprising:
   an on board video camera on the mobile object for generating a video signal and a transmitter provided on the mobile object for transmitting said video signal from the mobile object on a first carrier frequency;
   first and second receivers that each receive the transmitted video signal on said first carrier frequency, said first and second receivers having at least partially overlapping detection areas and being located at spaced apart locations about the race track;
   a position detector for generating a position signal indicative of the position of said mobile object using indications other than parameters of the received video signal and carrier as the mobile object moves around the race track; and
   a controller located other than in the mobile object for selecting and outputting the video signal received by the first of the first and second receivers in response to the position signal and for thereafter selecting and outputting the video signal received by the second of the first and second receivers in response to change in the position signal as the mobile object moves around the track.

2. A system according to claim 1 wherein the controller changes from selecting and outputting the signal received by said first receiver to selecting and outputting the signal received by said second receiver when the mobile object is at a predetermined distance from said first receiver.

3. A system according to claim 1 wherein the first and second receivers have helical antennas.

4. A system according to claim 3 wherein said helical antennas are arranged about the race track at a height in the range of from 1.5 to 3 meters relative to the ground.

5. A system according to claim 1 wherein the transmitter can be controlled to transmit selectively on a plurality of frequencies.

6. A system according to claim 5 wherein the transmission frequency of the transmitter is controlled by the controller.

7. A system according to claim 1 wherein said position detector determines the position of said mobile object based on information provided by a timing system of the race track.

8. A system according to claim 1 additionally comprising a second on board video camera on a second mobile object and a second transmitter provided on said second mobile object, each transmitter simultaneously transmitting video signals to said receivers.

9. A system according to claim 1 wherein the receivers and the controller are interconnected by a network.

10. A system according to claim 9 wherein:
    the network comprises first and second signal lines;
    the output of each of the receivers is selectively connectable, under the control of said controller, to the first, the second or neither of said signal lines such that, in use, the output from one of said receivers is connected to the first signal line and the output of a second one of the receivers is connected to the second signal line; and
    said controller outputs the signal on the signal line connected to the receiver receiving the selected video signal.

11. A system according to claim 10 wherein the controller includes a further output connected to the signal line not connected to the receiver receiving the selected video signal.

12. A system according to claim 1 further comprising additional receivers located at spaced apart locations about the race track for receiving the transmitted video signal, the placement and number of receivers sufficient to ensure that there are at least partially overlapping reception areas between adjacent receivers and that there is never a break in the reception of the transmitted video signal as the mobile object moves completely around the race track.

13. A system according to claim 1 wherein the mobile object is a race car.

14. A method of communicating a video signal between a mobile object moving on a race track and a stationary location, the method comprising the steps of:
    generating a video signal with an on board video camera mounted on the mobile object;
    transmitting the video signal on a first carrier frequency from a transmitter on the mobile object;
    providing at least first and second receivers at spaced apart locations about the race track that each receive the video signal from the transmitter on the mobile object on said first carrier frequency; and
    determining the location of the moving mobile object on the race track using indications other than signal parameters of the received video signal or its carrier; and
    selecting with a controller located other than in the mobile object the video signal received by one of said first and second receivers for output at said stationary location, on the basis of the location of said mobile object as determined in the determining step.

15. A method according to claim 14 wherein the mobile object is a race car.

* * * * *